(12) United States Patent
Tarazi et al.

(10) Patent No.: US 12,390,303 B2
(45) Date of Patent: Aug. 19, 2025

(54) CONICAL-DISC-CUTTING-BUR

(71) Applicant: STRAUSS & CO LTD ISRAEL, Ra'Anana (IL)

(72) Inventors: Eyal Tarazi, Caesarea (IL); Shlomy Rubanenko, Kiryat-Ono (IL)

(73) Assignee: STRAUSS & CO LTD ISRAEL, Ra'Anana (IL)

( * ) Notice: Subject to any disclaimer, the term of this patent is extended or adjusted under 35 U.S.C. 154(b) by 328 days.

(21) Appl. No.: 18/114,806

(22) Filed: Feb. 27, 2023

(65) Prior Publication Data
US 2024/0285374 A1    Aug. 29, 2024

(51) Int. Cl.
*A61C 5/77*    (2017.01)

(52) U.S. Cl.
CPC ..................... *A61C 5/77* (2017.02)

(58) Field of Classification Search
CPC ............... A61C 3/02; A61C 3/06; A61C 5/77
USPC ........................................................ 433/223
See application file for complete search history.

(56) References Cited

U.S. PATENT DOCUMENTS

| | | | | |
|---|---|---|---|---|
| 826,818 A * | 7/1906 | Abbott | ...................... | A61C 3/06 15/190 |
| 1,106,894 A * | 8/1914 | Samphere | ................ | A61C 3/06 451/911 |
| 1,210,052 A * | 12/1916 | Davis | ....................... | A61C 3/06 279/99 |
| 1,277,020 A * | 8/1918 | Young | ....................... | A61C 3/06 433/166 |
| 1,294,423 A * | 2/1919 | Davis | ....................... | A61C 3/06 451/541 |
| 1,646,330 A * | 10/1927 | Taylor | ...................... | A61C 3/06 403/360 |
| 2,411,234 A * | 11/1946 | Silver | ...................... | A61C 3/06 433/122 |
| 2,685,738 A * | 8/1954 | Leff | ......................... | A61C 3/06 433/134 |
| 2,697,878 A * | 12/1954 | Oberley | ................... | A61C 3/06 451/450 |
| 2,842,844 A * | 7/1958 | Seal | ......................... | A61C 3/06 451/529 |
| 2,855,673 A * | 10/1958 | Gruenwald | ............... | A61C 3/02 433/218 |
| 2,877,105 A * | 3/1959 | Smith | ...................... | B24D 3/14 51/308 |
| 2,997,820 A * | 8/1961 | Skoog | ..................... | B24D 7/04 451/541 |
| 3,101,546 A * | 8/1963 | Thomas | ................... | A61C 3/02 433/165 |
| 3,309,772 A * | 3/1967 | Lieb | ........................ | A61C 3/02 76/108.1 |
| 3,495,362 A * | 2/1970 | Hillenbrand | ........... | B24D 11/00 451/527 |
| 3,858,368 A * | 1/1975 | Cocherell | .............. | B24D 13/00 451/490 |
| 3,979,829 A * | 9/1976 | Lemos | .................... | A61C 3/02 433/165 |

(Continued)

*Primary Examiner* — Matthew M Nelson
(74) *Attorney, Agent, or Firm* — Smith Tempel Blaha LLC; Gregory Scott Smith

(57) ABSTRACT

A novel disc-cutting bur to be used by a dentist in order to cut ceramic crowns is disclosed. The disc cutting bur may comprise a shank and a cutting disc, wherein the shape of the cutting disc is a truncated cone.

15 Claims, 1 Drawing Sheet

(56) References Cited

U.S. PATENT DOCUMENTS

| | | | | |
|---|---|---|---|---|
| 4,182,037 A * | 1/1980 | Ellman | A61C 1/00 | 433/125 |
| 4,636,171 A * | 1/1987 | Martin | A61C 3/06 | 433/134 |
| 4,681,541 A * | 7/1987 | Snaper | A61C 3/02 | 433/165 |
| 4,889,489 A * | 12/1989 | Von Weissenfluh | B24D 5/16 | 433/134 |
| 4,992,049 A * | 2/1991 | Weissman | A61C 5/00 | 433/218 |
| 5,078,754 A * | 1/1992 | Jefferies | A61C 15/041 | 106/3 |
| 5,273,559 A * | 12/1993 | Hammar | B24D 3/32 | 51/293 |
| 5,310,342 A * | 5/1994 | Bernstein | A61C 3/06 | 451/541 |
| 6,012,971 A * | 1/2000 | Friel, Sr. | B24B 33/081 | 51/298 |
| 6,019,603 A * | 2/2000 | Von Weissenfluh | A61C 3/06 | 433/134 |
| 6,093,084 A * | 7/2000 | Jefferies | A61K 6/30 | 451/37 |
| 6,217,330 B1 * | 4/2001 | Danger | B24D 13/14 | 433/166 |
| 11,284,965 B1 * | 3/2022 | Galler | A61C 1/082 | |
| 2008/0085490 A1 * | 4/2008 | Jabri | A61C 3/06 | 433/136 |
| 2009/0017420 A1 * | 1/2009 | Jabri | A61C 3/06 | 433/136 |
| 2012/0244496 A1 * | 9/2012 | Jefferies | A61C 3/06 | 433/142 |
| 2013/0052612 A1 * | 2/2013 | Smailus | A61C 3/06 | 433/142 |
| 2015/0037755 A1 * | 2/2015 | Luzzader | A61C 3/14 | 433/165 |
| 2015/0230883 A1 * | 8/2015 | Yumiyama | A61C 3/02 | 433/166 |
| 2018/0200034 A1 * | 7/2018 | Deville | A61C 9/004 | |
| 2024/0285374 A1 * | 8/2024 | Tarazi | A61C 5/77 | |

* cited by examiner

CONICAL-DISC-CUTTING-BUR

FIELD OF THE DISCLOSURE

The present disclosure relates to the field of dental instruments. More particularly the disclosure relates to a novel cutting bur that can be for precise cutting of ceramic crowns, for example.

BACKGROUND

Various dental procedures require removing of a ceramic crown from a tooth in order to treat the tooth. Usually a dentist uses a diamond bur or a Tungsten carbide bur in order to cut ceramic crown. Some of the burs have tapered shape other have ball shape or cylindrical shape. The ceramic crowns can be made of Zirconia or Lithium-desilicated, Porcelain, etc.

In order to cut a ceramic crown or a tooth, a cutting bur is associated with a dental-hand-piece (DHP). The DHP can be attached to a motor with a gear that may rotate the cutting bur at a speed of hundreds of thousands of rounds-per-minute (RPM). The rotation speed can be in the range of 60,000 to 450,000 rpm, 200,000 rpm for example. Currently the cutting is done vertically along the vertical axis of the tooth with a cylindrical or tapered cutting bur. This alignment is difficult to maneuver and as such generates excess torque on the tooth and on the components of the DHP and can affect the lifetime of the DHP.

BRIEF SUMMARY

The needs and the deficiencies that are described above are not intended to limit the scope of the inventive concepts of the present disclosure in any manner. The needs are presented for illustration only. The disclosure is directed to a novel Conical-Disc-Cutting-Bur (CDCB).

An example embodiment of a CDCB may comprise a shank. One end of the shank can be configured to be associated with a DHP. The other end of the shank is associated with a top of a truncated conical disc. The diameter of the base of the truncated conical disc can be in the range of 2 to 7 mm, 5 mm for example. The height of the truncated conical disc can be in the range of 0.5 to 5 mm, 2 mm for example. The length of the shank can be in the range of 13 to 35 mm, 20 mm for example. In some example embodiments of the CDCB the shank can be associated with Grit-Size marking. The thickness of the side surface of the truncated conical disc can be in the range of 0.5 to 2.0 mm, 1 mm for example. In some example embodiment of the CDCB the edges of the conical surface can be rounded.

In some example embodiments of CDCB the angle between the radius of the base and the slant height of the con can be in the range of 5 to 35 degrees for example. In some embodiments the angle can be between 15 to 20 degrees, 17 degrees for example.

Some example embodiments of CDCB can be configured to be associated with high speed turbine, air rotor, contra angle or any other rotary machine. Yet, other example embodiments of CDCB can be configured to be associated with a DHP.

Some example embodiments of CDCB can be made of steel and the surface of the truncated conical disc can be coated with an abrasive material. Non limiting examples for abrasive material can be natural diamond powder or synthetic diamond powder. In some example embodiments of CDCB the shank can be made of Tungsten carbide or any other metal and the side surface of the truncated conical disc can also be made of Tungsten carbide (or any other metal) having shape of teeth of a saw. Coating technique of cutting bur and manufacturing technique of cutting bur are well known to a person having an ordinary skill in the art and will not be further disclosed. Along the present disclosure and the claims the term Tungsten can be used as representative term for any metal. Along the present disclosure and the claims the term diamond can be used as representative term for any type of abrasive material.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE DRAWINGS

Exemplary embodiments of the present disclosure will be understood and appreciated more fully from the following detailed description, taken in conjunction with the drawings in which.

DETAILED DESCRIPTION OF SOME EXAMPLE EMBODIMENTS

Turning now to the figures in which like numerals represent like elements throughout the several views, in which exemplary embodiments of the disclosed techniques are described. For convenience, only some elements of the same group may be labeled with numerals.

The purpose of the drawings is to describe examples of embodiments and not for production purpose. Therefore, features shown in the figures are chosen for convenience and clarity of presentation only. In addition the figures are drawn out of scale. Moreover, the language used in this disclosure has been principally selected for readability and instructional purposes, and may not have been selected to define or limit the inventive subject matter, resort to the claims being necessary to determine such inventive subject matter.

In this specification, these implementations, or any other form that the invention may take, may be referred to as techniques. In general, the order of the steps of disclosed processes may be altered within the scope of the invention. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In the present disclosure the terms task, method, and process can be used interchangeably. In addition the terms element and section can be used interchangeably.

Figure 1:
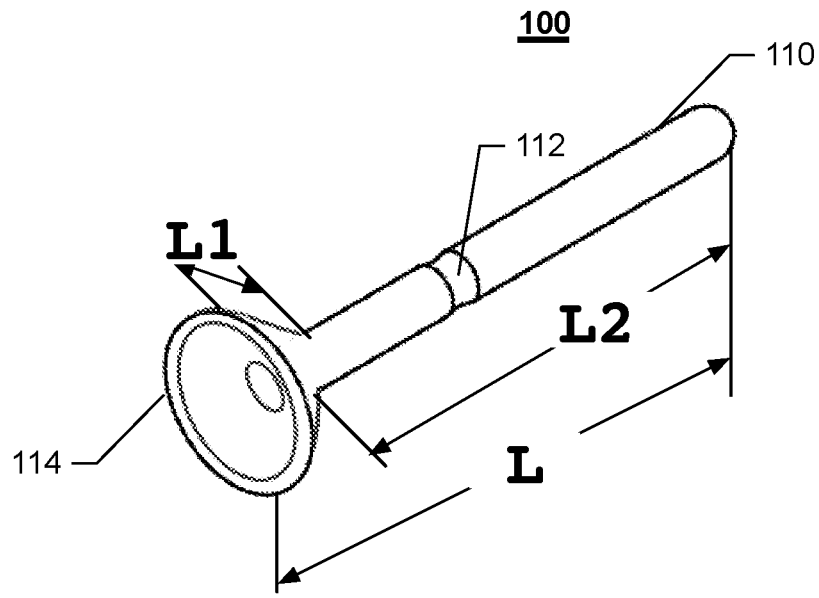
FIG. 1 schematically illustrates an example of CDCB.

FIG. 1 schematically illustrates an example of CDCB 100. CDCB 100 may comprise a shank 110, having a slot 112 and is associated with a conical cutting disc 114. The overall length "L" of an example of CDCB 100 can be in the range of 13.5 to 40 mm. A common value of "L" can be 22 mm, for example. The value of an example slant "L1" of the conical cutting disc 114 can be in the range of 0.5 to 5.0 mm. A common value of "L1" can be 2.0 mm, for example. The value of an example shank 110 "L2" of CDCB 100 can be in the range of 13.0 to 35 mm. A common value of "L2", can be 20.0 mm, for example. Slot 112 can be used for marking the Grit-Size of the cutting disc.

An example of CDCB 100 may be made steel and the side surface of the truncated conical disc 114 can be coated with abrasive material such as but not limited to natural diamond powder or synthetic diamond powder. In some example embodiments of CDCB 100 the shank 110 can be made of Tungsten carbide or any other metal and the side surface of the truncated conical disc 114 can also be made of Tungsten carbide (or any other metal) having shape of teeth of a saw.

An example of CDCB 100 can be manufactured by a Computer-Numerical-Control (CNC) machine that is loaded with a long wire of steel and is programed to process the long wire into a plurality CDCB 100. Coating technique of cutting burs and manufacturing technique of cutting bur are well known to a person having an ordinary skill in the art and will not be further disclosed.

Figure 2:
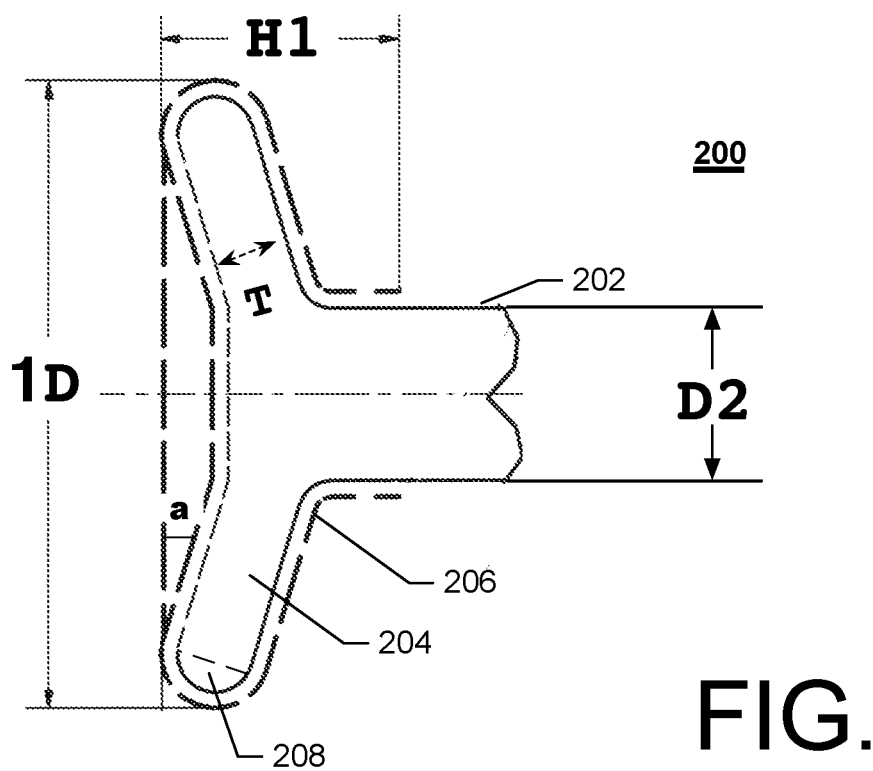
FIG. 2 schematically illustrates a cross-sectional view of a portion of a CDCB that shows the truncated conical disc.

FIG. 2 schematically illustrates a cross-sectional view 200 of a portion of a CDCB 202 that shows the truncated conical disc 204. The truncated conical disc 204 can be coated 206 with abrasive material such as but not limited to natural diamond powder or synthetic diamond powder. The diameter D1 of the base of the truncated conical disc 204 can be in the range of 2 to 7 mm, 5 mm for example. The diameter D2 of an example shank CDCB 202 can be in the range of one to 3 mm, 1.6 mm for example.

The angle "a" between a diameter D1 of the base and the slant height of the con 204 can be in the range of 5 to 35 degrees for example. In some embodiments of CDCB 202 the angle "a" can be between 15 to 20 degrees, 17 degrees for example. The thickness "T" of the side surface of the truncated conical disc 204 can be in the range of 0.5 to 2.0 mm, 1 mm for example. In some example embodiment of the CDCB 202 the edges 208 of the conical surface can be rounded. The height "H1" of the coated area can be in the range of 1.5 to 3.5 mm, 2 mm for example.

In the description and claims of the present disclosure, each of the verbs, "comprise", "include", "have", and conjugates thereof, are used to indicate that the object or objects of the verb are not necessarily a complete listing of members, components, elements, or parts of the subject or subjects of the verb.

The present disclosure has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A disc-cutting-bur for cutting ceramic crown, comprising:
   a shank; and
   a cutting disc;
   wherein the shape of the cutting disc is a truncated conical disc; and
   wherein edges of the conical surface are rounded and coated with an abrasive material;
   whereby the edges, which are rounded and coated, are used for cutting a ceramic crown, thus during operation an operator applies pressure toward the rounded edges.

2. The disc-cutting-bur of claim 1, wherein an angle between a radius, of a base of the truncated conical disc, and a slant height of the truncated cone is in the range between 5 to 35 degrees.

3. The disc-cutting-bur of claim 2, wherein the angle is 17 degrees.

4. The disc-cutting-bur of claim 1, wherein a diameter of the base of the truncated conical disc is in the range of 2 to 7 mm.

5. The disc-cutting-bur of claim 4, wherein the diameter of the base of the truncated conical disc is 5.5 mm.

6. The disc-cutting-bur of claim 1, wherein the disc is coated with abrasive material.

7. The disc-cutting-bur of claim 6, wherein the abrasive material comprises diamond powder.

8. The disc-cutting-bur of claim 6, wherein the height of the coated area is in the range of 1.5 to 3.5 mm.

9. The disc-cutting-bur of claim 8, wherein the height of the coated area is 2 mm.

10. The disc-cutting-bur of claim 1, wherein the thickness of the side surface of the truncated conical disc is in the range of 0.5 to 2.0 mm.

11. The disc-cutting-bur of claim 10, wherein the thickness of the side surface is 0.9 mm.

12. The disc-cutting-bur of claim 1, wherein the disc-cutting-bur is obtained by a Computer-Numerical-Control (CNC) machine.

13. The disc-cutting-bur of claim 12, wherein the disc-cutting-bur is obtained by the CNC that is configured to process a wire of steel into a plurality of disc-cutting-burs.

14. The disc-cutting-bur of claim 1, wherein the top of the truncated conical disc is associated with one end of the shank.

15. The disc-cutting-bur of claim 1, wherein the ceramic crown is made of Zirconia.

* * * * *